(12) United States Patent  
Ma et al.

(10) Patent No.: US 7,873,315 B2  
(45) Date of Patent: Jan. 18, 2011

(54) REPEATER FOR PROVIDING COVERAGE WITHIN A WIRELESS COMMUNICATIONS NETWORK AND METHODS THEREOF

(75) Inventors: Zhengxiang Ma, Summit, NJ (US); Dennis R. Morgan, Morristown, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 899 days.

(21) Appl. No.: 11/730,277

(22) Filed: Mar. 30, 2007

(65) Prior Publication Data

US 2008/0242226 A1    Oct. 2, 2008

(51) Int. Cl.  
*H04B 7/15* (2006.01)

(52) U.S. Cl. .................................... 455/11.1

(58) Field of Classification Search .......... 455/7, 455/11.1, 12.1, 15, 16, 550.1, 213, 306, 339  
See application file for complete search history.

(56) References Cited

U.S. PATENT DOCUMENTS

2005/0190822 A1* 9/2005 Fujii et al. .................. 375/211

* cited by examiner

*Primary Examiner*—Tu X Nguyen  
(74) *Attorney, Agent, or Firm*—Harness, Dickey & Pierce, P.L.C.

(57) ABSTRACT

A repeater and methods thereof are provided. The example repeater first receives a donor signal (e.g., from a base station for repeating in a downlink direction, from a mobile station for repeating in an uplink direction, etc.) and a transmitted version of an internally generated pilot signal. The repeater configures an adaptive filter signal to cancel the received transmitted version of the internally generated pilot signal. In an example, the first receiving and configuring steps may be performed during a first mode of operation (e.g., a "training" mode). The repeater second receives the donor signal and a retransmitted version of the donor signal (e.g., retransmitted from the repeater). The repeater cancels the retransmitted donor signal based on the configured adaptive filter signal.

7 Claims, 4 Drawing Sheets

"Training Mode"

"Operation Mode"

REPEATER FOR PROVIDING COVERAGE WITHIN A WIRELESS COMMUNICATIONS NETWORK AND METHODS THEREOF

BACKGROUND OF THE INVENTION

1. Field of the Invention

Example embodiments of the present invention are related generally to a repeater for providing coverage within a wireless communications network and methods thereof.

2. Description of the Related Art

The cellular wireless industry has witnessed tremendous growth in the past two decades. The cell phone has become the most popular personal electronic device, with penetration rates reaching 70-80% in many regions of the world. Even in regions with well developed wireline telephony infrastructure, such as North America, people have begun to "cut the wire" by making the cell phone their only phone. However, conventional cellular networks in North America today are still lacking in terms of coverage area.

For example, the interiors of large buildings often fail to maintain a coverage signal sufficient to support a cellular connection. Also, both downlink (e.g., base station to mobile station) and uplink (e.g., mobile station to base station) signals are typically weakest at the "edge" or border of the coverage area provided by a given base station due to shadowing and/or attenuation. Accordingly, there is a growing need to boost signal strength in these fringe locations, particularly within suburban and rural residential buildings.

Conventional same-frequency repeaters may be used to enhance wireless coverage in problem areas without necessitating a change in the supporting infrastructure. A same-frequency repeater is a bi-directional wideband radio frequency (RF) amplifier with two antennas. A first of the antennas is typically a highly directional antenna pointing to the nearest base station, and a second of the antennas is a broad-beam antenna providing coverage to the desired area. For example, the first antenna may be positioned on a roof of a building and the second antenna may be a strategically placed indoor antenna.

Such a repeater typically requires a precise installation so that feedback received at a "receive" antenna (e.g., an antenna receiving a "donor signal" that is to be amplified, such as from a base station in the downlink or from one or more mobile stations in the uplink) from a "retransmit" antenna (e.g., the antenna transmitting the amplified donor signal, such as to a base station in the uplink or to one or more mobile stations in the downlink) does not cause the system to undergo regenerative oscillation, which is a phenomenon where the gain exceeds the feedback loss (e.g., generating a "loop" which may exponentially increase the signal strength of the amplified, retransmitted signal). Regenerative oscillation may disrupt conventional macro-cellular networks by causing instability.

Accordingly, if high gain is necessary at the repeater, the receive and retransmit antennas are typically kept physically isolated from each other to reduce or avoid the regenerative oscillation. However, because the receive and retransmit antennas must typically be positioned precisely so as to avoid regenerative oscillation by isolating the receive and retransmit antennas, the cost and difficulty of installing a conventional same-frequency repeater may be significant.

Further, conventionally, it is difficult to simply cancel or filter out the feedback signal (e.g., the amplified donor retransmission), transmitted by the retransmit antenna, at the receive antenna, because the feedback signal may not remain constant during operation. And, statically, filtering the feedback signal from the signal spectrum at the receive antenna is not very effective. Accordingly, the gain obtained by a repeater is conventionally limited to the loss of the retransmitted signal on the feedback path such that the donor signal remains stronger than the feedback of the retransmitted signal at the receive antenna.

SUMMARY OF THE INVENTION

An example embodiment of the present invention is directed to a method of providing coverage within a wireless communications network, including receiving a donor signal and a transmitted version of an internally generated pilot signal. An adaptive filter signal is configured to cancel the received transmitted version of the internally generated pilot signal. Next, the donor signal and a retransmitted version of the donor signal are received. The retransmitted donor signal is canceled based on the configured adaptive filter signal.

Another example embodiment of the present invention is directed to a method of providing coverage within a wireless communications network, including configuring an adaptive filter signal to cancel an amplified and retransmitted version of an internally generated dummy signal during a first mode of operation. Then, during a second mode of operation, an amplified and retransmitted version of a received external signal is canceled based on the configured adaptive filter signal.

Another example embodiment of the present invention is directed to a repeater for providing coverage within a wireless communications network, including an antenna receiving a donor signal and an amplified version of an internally generated pilot signal during a first mode of operation. Then, during a second mode of operation, the donor signal and an amplified version of the donor signal. An adaptive filter signal generated by an adaptive signal is configured during the first mode of operation so as to cancel the amplified version of the internally generated pilot signal. A combiner cancels the amplified version of the donor signal during the second mode of operation based on the configured adaptive filter signal.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

In order to better understand the example embodiments, a repeater according to an example embodiment of the present invention will be described. Then, two different modes of operation for the repeater according to other example embodiments of the present invention will be described.

Example Repeater

Figure 1:
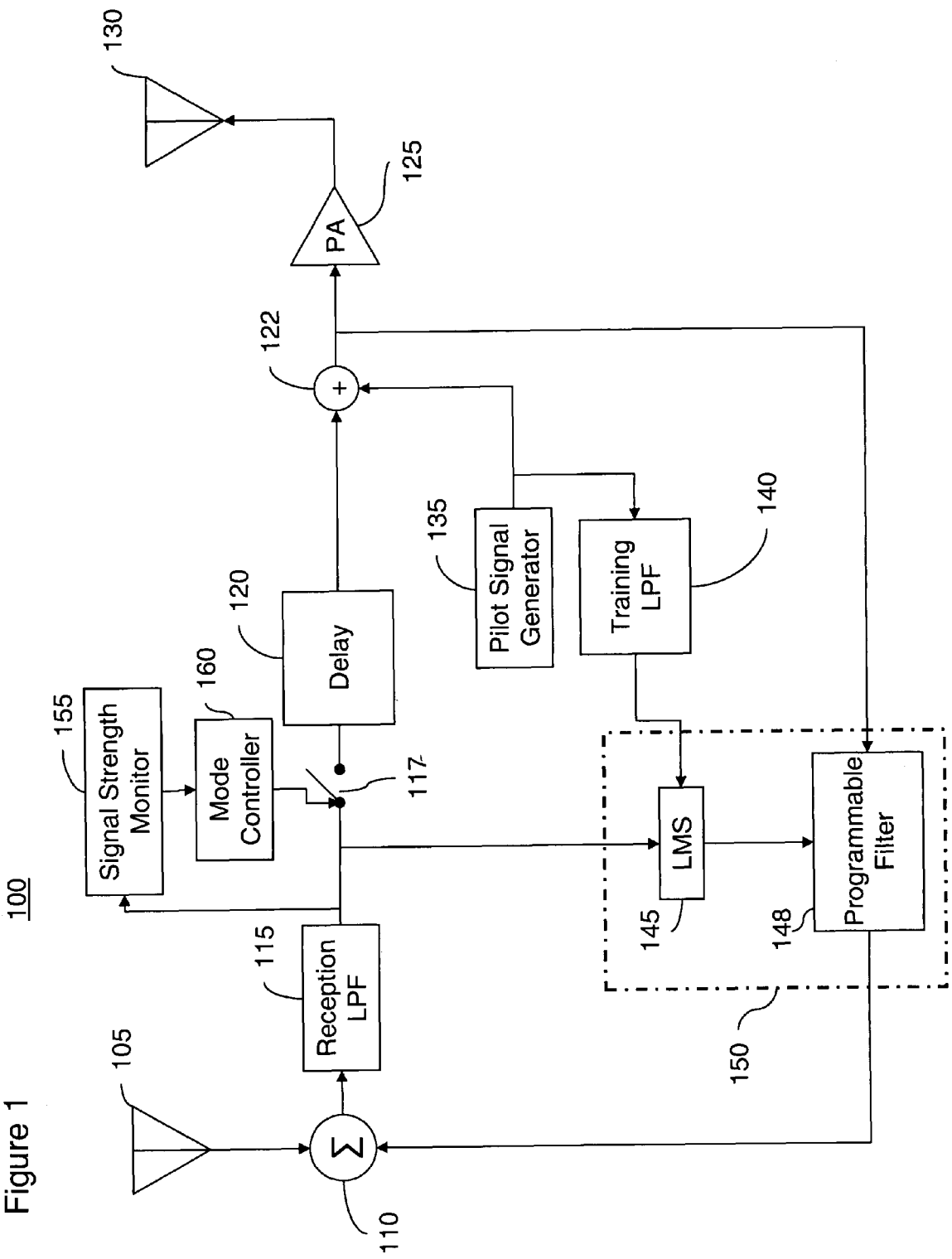
FIG. 1 illustrates a repeater according to an example embodiment of the present invention.

FIG. 1 illustrates a repeater 100 according to an example embodiment of the present invention. In the example embodiment of FIG. 1, the repeater 100 includes a receive antenna 105, a combiner 110, a reception low pass filter (LPF) 115, a switch 117, a delay 120, a combiner 122, a retransmit power amplifier (PA) 125, a retransmit antenna 130, a pilot signal generator 135, a training LPF 140, an adaptive filter 150, a signal strength monitor 155 and a mode controller 160. The adaptive filter 150 includes a least mean square (LMS) unit 145 and a programmable filter 148. In an example, the mode controller 160 may output a selection signal to the switch 117 which determines whether the repeater 100 operates in a "training mode" or an "operation mode", which will be discussed below in greater detail with respect to FIGS. 2 and 4, respectively.

In an example, the repeater 100 may be positioned within a wireless communications network in proximity to a region where coverage extension is desired. For example, the repeater 100 may be placed near a large, commercial building which does not obtain a good, interior coverage signal. In this example, the repeater 100 is used to extend the coverage area to areas within the building which would otherwise not receive an adequate coverage signal.

Also, while the input to the PA 125 is illustrated as routed to the adaptive filter 150, it is understood that other example embodiments of the present invention may route the output of the PA 125 to the adaptive filter 150, for example, in order to take non-linearity effects incurred at the PA 125 into account. Thus, the adaptive filter 150 may receiver either the un-amplified input to the PA 125 or the amplified output of the PA 125.

Further, while not explicitly shown in FIG. 1, it will be appreciated that a routing of signals between the illustrated elements may be achieved with a coupler, or alternatively by simply splitting the signal off from a "main" path. Couplers are well known in the art and allow, for example, signals to be monitored without a significant signal degradation on the primary path.

The repeater 100 may further be used in either an "uplink" and/or "downlink" direction. For example, the repeater 100 may be used to relay uplink messages from one or more mobile stations to a base station, or alternatively to relay downlink messages (e.g., a base station pilot signal) from a base station to one or more mobile stations. In another example two repeaters 100 may be deployed as downlink and uplink repeaters, respectively.

The operation of the repeater 100 FIG. 1 will be described in greater detail below with respect to FIGS. 2 and 3.

Example Repeater in Training Mode

As will now be described, the repeater 100 of the example embodiment of FIG. 1 may operate by switching between a training mode and an operation mode. For example, during an initial start-up of the repeater 100, the repeater 100 enters the training mode.

Generally, as will be described in greater detail below, during the training mode, the repeater 100 generates an internal pilot signal and transmits the internal pilot signal from the retransmit antenna 130. The "original" version of the transmitted pilot signal is known at the repeater 100, and this information is used to cancel the transmitted version of the internal pilot signal from the signal spectrum received at the receive antenna 105 through an adjustment of parameters associated with the adaptive filter 150. Once the parameters of the adaptive filter 150 are adjusted, the repeater 100 switches to the operation mode where an adaptive filter signal generated by the adaptive filter 150, is used to cancel the feedback signal of a retransmitted donor signal (e.g., along with the transmission of the internal pilot signal transmission) during an operation of the repeater 100.

Figure 2:
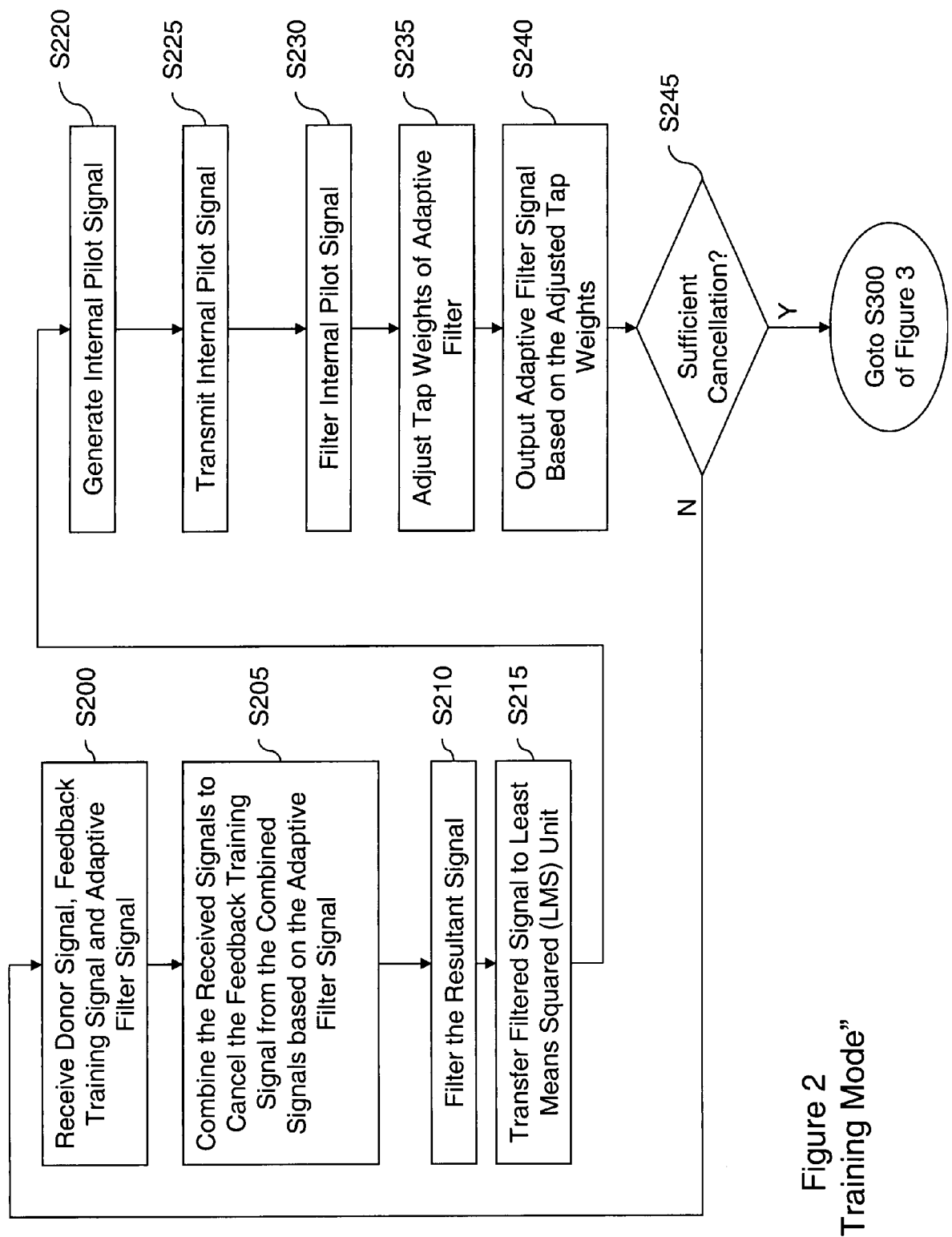
FIG. 2 illustrates a training mode of the receiver of FIG. 1 according to an example embodiment of the present invention.

In the example embodiment of FIG. 2, during the training mode, the switch 117 is "opened", such that the output of the reception LPF 115 is not passed to the delay 120.

FIG. 2 illustrates a training mode of the receiver 100 of FIG. 1 according to an example embodiment of the present invention.

In the example embodiment of FIG. 2, in step S200, the receive antenna 105 receives a donor signal (e.g., from a base station for a downlink repeater, from one or more mobile stations for an uplink repeater, etc.), a feedback training signal (e.g., a retransmitted and amplified version of a training pilot signal output from the retransmit antenna 130) and a given amount of uncorrelated noise. The signals received at the receive antenna 105 are passed to the combiner 110. The combiner 110 receives the signals from the receive antenna 105 and further receives an adaptive filter signal from the adaptive filter 150. The combiner 110 combines the received signals together in step S205 and outputs the combined signal to the reception LPF 115. As will be described in greater detail later, the adaptive filter signal is configured such that, when combined with the feedback training signal and the received donor signal at the combiner 110, the adaptive filter signal substantially "cancels" or removes the feedback training signal.

The reception LPF 115 is representative of a receiver front end, an anti-aliasing filter and a reconstruction filter. Accordingly, in step S210, the reception LPF 115 receives the combined signal (e.g., having the feedback training signal substantially canceled) from the combiner 110 and filters the combined signal. The filtering performed by the reception LPF 115 is well-known in the art and will not be described further for the sake of brevity. For example, the filtering performed by the reception LPF 115 in step S210 may include any filtering, excluding the feedback training signal cancellation of step S205, for the overall feedback path.

In step S215, the filtered signal output by the reception LPF 115 is received at the LMS unit 145 of the adaptive filter 150. The filtered signal output by the reception LPF 115 is output to the LMS unit 145, but not to the PA 125, (e.g., because the switch 117 is opened such that the filtered signal output by the reception LPF 115 is not output to the delay 120 and/or the PA 125), such that the filtered signal output by the reception 115 is not actually transmitted from the repeater 100.

In an alternative example, while not illustrated in FIG. 1, the filtered donor signal may first pass through the delay 120 before reaching the LMS unit 145 (e.g., if the switch 117 is moved to a position between the delay 120 and the PA 125). For example, the delay 120 may be representative of an actual hardware device configured to at least slightly delay the filtered donor signal. For example, a system designer may add a given amount of delay at the delay 120 in order to increase stability. For example, if a large transient burst occurs, the large transient burst may not concurrently (e.g., simultaneously) affect both the LMS unit 145 and the adaptive filter 150 if a sufficient amount of delay is added via the delay 120. Alternatively, in another example, the delay 120 may be indicative of an inherent delay in the repeater 100 (e.g., such as a signal processing or propagation delay) and is not configured to actually insert additional delay into the filtered signal output by the reception LPF 115.

In the example embodiment of FIG. 2, in step S220, the pilot signal generator 135 generates a QPSK pseudo-noise (PN) pilot signal (e.g., a "training pilot signal", which may correspond to any well-known pilot signal). In step S225, the training pilot signal, which may alternatively be referred to as an internally generated pilot signal, is transferred from the pilot signal generator 135 and combined with the filtered signal output from the delay 120 at the combiner 122. The combined signal is sent to the PA 125, which amplifies the training pilot signal with a given gain (e.g., selected by a system engineer and/or scheduled by a controller), and the amplified pilot signal is then transmitted from the retransmit antenna 130. Accordingly, it will be appreciated that the transmitted, amplified pilot signal at step S225 corresponds to the feedback training signal received at the receive antenna 105 in step S200.

In the example embodiment of FIG. 2, in step S230, the training pilot signal is also transferred from the pilot signal generator 135 to the training LPF 140 (e.g., in addition to the PA 125 as in step S225). The training LPF 140 is configured in the same manner as the reception LPF 115. Accordingly, in step S230 the training LPF 140 filters the training pilot signal received from the pilot signal generator 135 in the same manner as described above with respect to step S210, and outputs the filtered pilot signal to the LMS unit 145 of the adaptive filter 150.

In step S235, the LMS unit 145 adjusts tap weights of the adaptive filter 150 based on an adaptive filter adjustment process which will be described in greater detail below. Generally, the LMS unit 145 adjusts the tap weights used by the programmable filter 148 of the adaptive filter 150 to generate the adaptive filter signal (e.g., in step S240, described below) so as to increase a cancellation of the feedback training signal at the combiner 110 (e.g., see step S210).

Next, in step S240, the programmable filter 148 of the adaptive filter 150 generates the adaptive filter signal based on the adjusted tap weights, as will be described in greater detail below. For example, as will be described in greater detail below, the programmable filter 148 may be a transversal filter, which is well-known in the art.

Throughout the process of FIG. 2, the signal strength monitor 155 continuously measures signal strengths of the feedback training signal component of the filtered signal output from the reception LPF 115. For example, because the output of the pilot signal generator 135 is fixed and known, the feedback training signal component of the filtered signal output from the reception LPF 115 may be isolated using well-known correlation techniques. The signal strength monitor 155 provides the measured signal strength to the mode controller 160. In step S245, the mode controller 160 checks whether the feedback training signal has been sufficiently canceled based on the measured signal strength of the feedback training signal component of the filtered signal provided from the signal strength monitor 155. For example, the feedback training signal may be determined to be sufficiently canceled based on a comparison between the measured signal strength of the feedback training signal component and a given threshold. For example, if the signal strength of the feedback training signal component is less than the given threshold (e.g., 15 dB, 20 dB, etc.), the cancellation of the feedback training signal may be determined to be sufficient.

In step S245, if the repeater 100 determines the feedback training signal is not sufficiently canceled, the process returns to step S200 and the training mode continues. Otherwise, if the repeater 100 determines the feedback training signal is sufficiently canceled, the process advances to step S300 of FIG. 4, where the switch 117 is closed and an operation mode of the repeater 100 is executed. The process of FIG. 3 will be described in detail below after the following detailed description of the adaptive filter adjustment process of step S235.

Adaptive Filter Adjustment Process

Figure 3:
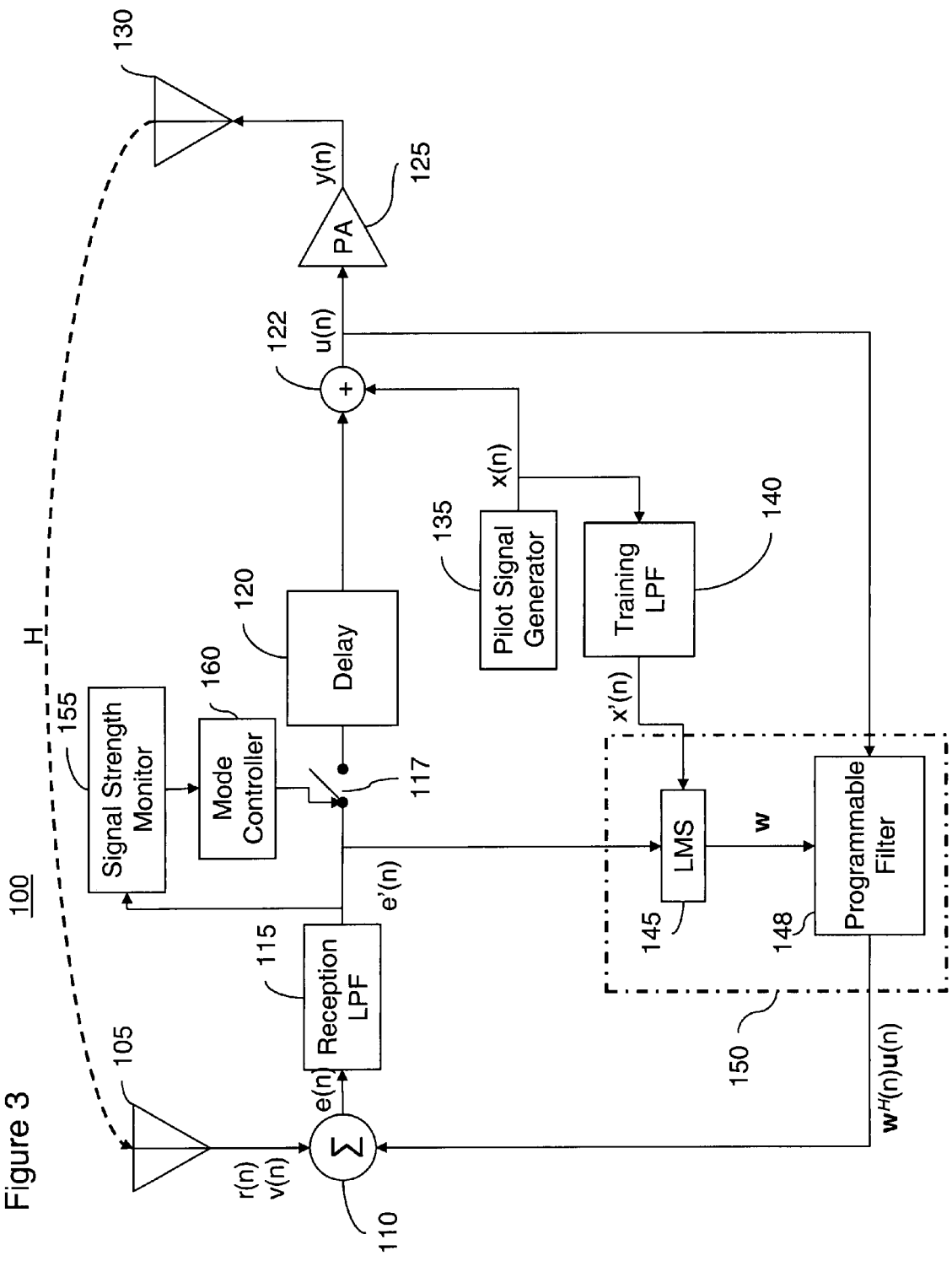
FIG. 3 illustrates the repeater of FIG. 1 including the denotations associated with an adaptive filter adjustment process according to an example embodiment of the present invention.

FIG. 3 illustrates the repeater 100 of FIG. 1 including the denotations associated with an adaptive filter adjustment process according to an example embodiment of the present invention.

The adaptive filter adjustment process of step S235 of FIG. 2 will now be described in greater detail. Below, a "filtered-x" LMS (FXLMS) version of an adaptive filter adjustment process is described in detail. The FXLMS version is based upon the filtered pilot signal, or x'(n), output from the training LPF 140, as denoted below. However, it is understood that other adaptive filter adjustment processes may alternatively be employed in step S235, such as a filtered-x recursive least squares (FXRLS) process. FXRLS is well known in the art, and will not be described further for the sake of brevity.

Step S235 of FIG. 2 is performed by the adaptive filter 150, which includes the LMS unit 145 and the programmable filter 148. The programmable filter 148 is a transversal filter, which is similar to a tapped delay line where the tap signals are combined using adjustable "tap weights" or gains.

The signal r(n) received at the antenna 105 in step S200 may be expressed as follows:

$$r(n)=s(n)+h(n)*y(n)=s(n)h^T y(n) \qquad \text{Equation 1}$$

wherein s(n) denotes the donor signal (e.g., a signal received from a base station) and h(n)*y(n) denotes the feedback training signal, h(n) denotes a complex baseband impulse response of the feedback path (e.g., from the retransmit antenna 130 to the receive antenna 105), * denotes convolution and y(n) is the signal amplified by the PA 125, $h=[h_0, h_2, \ldots, h_{P-1}]^T$ is the length-P feedback path coefficient vector, superscript T denotes transpose, $y(n)=[y(n), y(n-1), \ldots, y(n-P+1)]^T$ is a vector of the P most recent output samples from the PA 125, and P is indicative of the physical feedback path. For example, P may be the number of significant multipath delays (in sampling periods) of the channel, and may vary for different propagation environments.

Below, a derivation of an adaptive filter vector w, which is used to generate the feedback cancellation signal or adaptive filter signal, generated by the adaptive filter 150, is discussed in detail. The adaptive filter vector w is generated by the LMS unit 145 of the adaptive filter 150, and the programmable filter 148 or transversal filter uses the adaptive filter vector w to generated the adaptive filter signal (e.g., $w^H(n)u(n)$) using well-known methodologies. Accordingly, at the combiner 110, the adaptive filter signal $w^H(n)u(n)$ is subtracted from r(n) and receiver noise v(n) is added, providing an error signal:

$$e(n)=r(n)-w^H(n)u(n)+v(n)=s(n)+h^T y(n)-w^H(n)u(n)+v(n) \qquad \text{Equation 2}$$

wherein $w(n)=[w_1(n), w_2(n), \ldots, w_L(n)]T$ is the length-L adaptive weight vector, superscript H denotes a conjugate transpose (e.g., a Hermitian conjugate transpose), $u(n)=[u(n), u(n-1), \ldots, u(n-L+1)]^T$ is a vector of the L most recent PA 125 input samples and L is a positive integer (e.g., selected by a system engineer).

The error signal e(n) and training pilot signal, denoted by x(n), are filtered by g(n) at the LMS unit 145, giving:

$$e'(n)=g(n)*e(n)=g^T e(n) \quad \text{Equation 3}$$

$$x'(n)=g(n)*x(n)=g^T x(n) \quad \text{Equation 4}$$

wherein $g=[g_0, g_2, \ldots, g_{Q-1}]^T$ is the length-Q LPF coefficient vector, $e(n)=[e(n), e(n-1), \ldots, e(n-Q+1)]^T$, and $x(n)=[x(n), x(n-1), \ldots, x(n-Q+1)]^T$.

With the above assumptions, the weight update algorithm, which may be executed by the adaptive filter 150, is expressed as:

$$w(n+1)=w(n)+\mu x'(n)e'^*(n) \quad \text{Equation 5}$$

wherein $\mu$ is the adaptive step size, $x'(n)=[x'(n), x'(n-1), \ldots, x'(n-L-1)]^T$, $x(n)$ denotes the pilot signal generated by the pilot signal generator 135 and filtered by the training LPF 140 and superscript * denotes a complex conjugate.

As used herein, the step size refers to the amount the adaptive filter vector w may be adjusted during each iteration of the training mode or process (e.g., steps S200 through S235 of FIG. 2). For example, the step size is selected so as to be large enough for the adaptive filter signal to converge to an acceptable level so as to cancel the feedback training signal, while small enough such that the donor signal s(n) does not adversely affect the "intended" adaptation to the pilot signal x(n) (e.g., which may be referred to as a "misadjustment"). For example, if the pilot signal power Px of the pilot signal x(n) is much lower than the signal power of the donor signal s(n), a relatively small step size may be selected (e.g., which may require additional iterations of the training mode of FIG. 2 and thereby increased computational complexity and/or processing time).

Further, a computational efficiency of the adaptive adjustment process may be increased by modifying Equation 5 to operate on multiple blocks of data at a given time. The block adaptive adjustment algorithm may be derived by:

$$X'(n)=[x'(n), x'(n-1), \ldots, x'(n-M+1)]=\text{hankel}[x'(n:-1: n-L+1), x'(n-L+1:n-L+1-M+1)] \quad \text{Equation 6}$$

wherein each block has size M, and M×1 filtered error vector is given by:

$$e'(n)=[e'(n), e'(n-1), \ldots, e'(n-M+1)]^T = E(n)g \quad \text{Equation 7}$$

where $$E(n)=[e(n), e(n-1), \ldots, e(n-M+1)]T=\text{hankel}[e(n:-1: n-M+1), e(n-M+1:-1:n-M+1-Q+1)] \quad \text{Equation 8}$$

wherein Equation 8 represents an M×Q matrix of error signals and hankel (C,R) forms a Hankel matrix with C defining the first column and R defining the last row.

Accordingly, with the above assumptions, the block adaptive adjustment algorithm is expressed as follows:

$$w(n+M)=w(n)+\mu X'(n)e'^*(n) \quad \text{Equation 9}$$

Accordingly, in step S235 of FIG. 2, the LMS unit 145 receives the filtered training pilot signal x'(n) and the filtered error signal e'(n), and may then execute either of Equations 5 or 9 in order to calculate an adjustment or "step" to the adaptive filter vector w. The adjustment is then programmed into the programmable filter 148, which modifies the adaptive filter signal $w^H(n)u(n)$ accordingly. Modifying a signal based on adjusted tap weights is well-known in the art, and a further description thereof has been omitted for the sake of brevity. If the adjustment to the adaptive filter signal results in sufficient cancellation of the feedback training signal h(n)*y(n), step S245 may advance to the operation mode process of FIG. 3; otherwise, the process returns to step S200 and the process of FIG. 2 repeats until the adaptive filter signal results in sufficient cancellation of the feedback training signal h(n)*y(n) from the signal r(n).

Example Repeater in "Operation "Mode"

Figure 4:
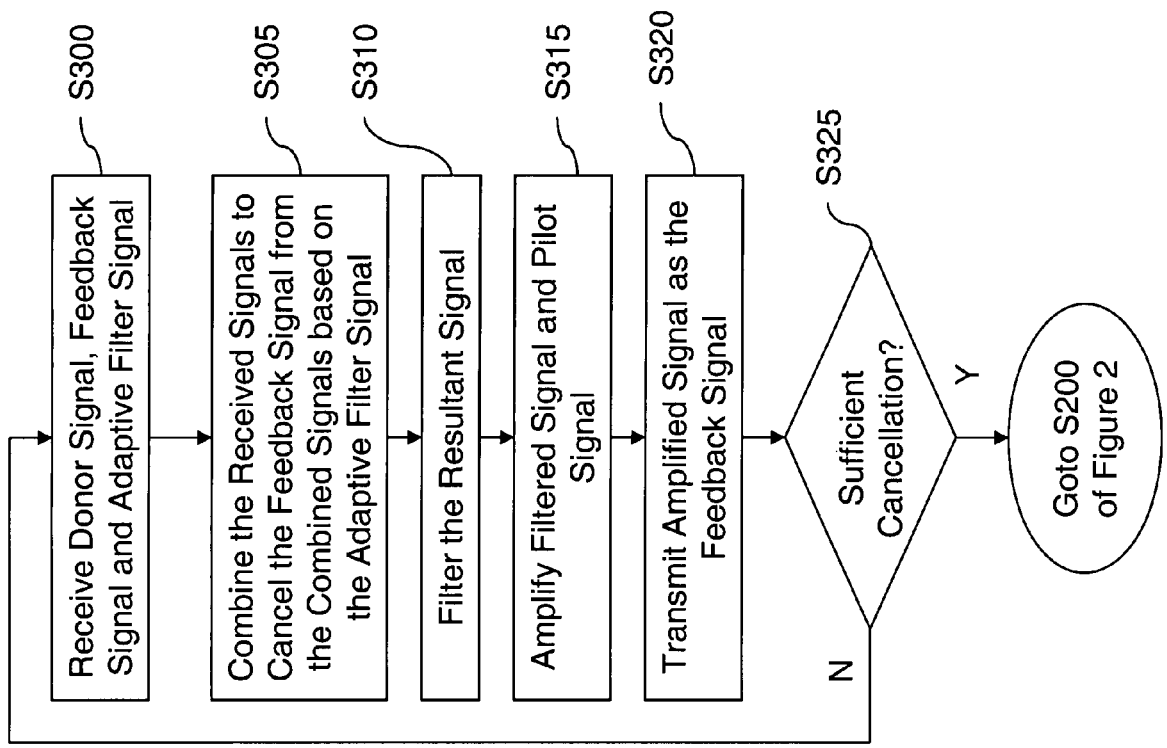
FIG. 4 illustrates an operation mode of the receiver of FIG. 1 according to another example embodiment of the present invention.

FIG. 4 illustrates an operation mode of the receiver 100 of FIG. 1 according to another example embodiment of the present invention.

In the example embodiment of FIG. 4, during the operation mode, the switch 117 is "closed", such that the output of the reception LPF 115 is passed to the delay 120.

In the example embodiment of FIG. 4, in step S300, the receive antenna 105 receives a donor signal (e.g., from a base station for a downlink repeater, from one or more mobile stations for an uplink repeater, etc.), a feedback signal (e.g., the feedback training signal or pilot signal as well as a retransmitted and amplified version of the received donor signal output from the retransmit antenna 130 in step S320, which is described later) and a given amount of uncorrelated noise. The signals received at the receive antenna 105 are passed to the combiner 110. The combiner 110 receives the signals from the receive antenna 105 and further receives an adaptive filter signal from the adaptive filter 150. For example, the adaptive filter signal may be established during steps S235 and S240 of FIG. 2, during the training mode, based on a transmitted, amplified version of the training pilot signal, and not the received donor signal. The combiner 110 combines the received signals together in step S305 and outputs the combined signal to the reception LPF 115. As described above, the adaptive filter signal is configured such that, when combined with the feedback signal and the received donor signal at the combiner 110, the adaptive filter signal substantially "cancels" or removes the feedback signal (e.g., the feedback training signal and the retransmitted donor signal). It will be appreciated that the donor signal is not retransmitted by the retransmit antenna 130 during the training mode, and the feedback training signal is canceled at step S205 of FIG. 2. In contrast, in the operation mode of FIG. 4, the feedback signal includes both the feedback training signal and the retransmitted donor signal, such that step S305 of FIG. 4 may substantially cancel both the feedback training signal and the retransmitted donor signal.

In step S310, the reception LPF 115 receives the combined signal from the combiner 110 and filters the combined signal. Accordingly, in step S310, the reception LPF 115 receives the combined signal (e.g., having the feedback signal, including the retransmitted donor signal, substantially canceled) from the combiner 110 and filters the combined signal. The filtering performed by the reception LPF 115 is well-known in the art and will not be described further for the sake of brevity. For example, the filtering performed by the reception LPF 115 in step S310 may include any filtering, excluding the feedback signal cancellation of step S305, for the overall feedback path. In a further example, step S310 of FIG. 4 may be performed in the same manner as step S210 of FIG. 2.

In the example embodiment of FIG. 4, in step S315, the filtered donor signal is transferred to the PA 125 via the closed switch 117 through the delay 120, which amplifies the filtered donor signal. Also in step S315, the pilot signal generated by the pilot signal generator 135 is also transferred to the PA 125, and is amplified along with the filtered donor signal. As shown in FIG. 1, the filtered donor signal may first pass through the delay 120 via the closed switch 117 before reaching the PA 125. The delay 120 may be representative of either a delay inherent to the repeater 100 (e.g., propagation delays, processing delays, etc.) or may alternatively be representative of an actual hardware device configured to at least slightly delay the filtered donor signal. For example, a system designer may add a given amount of delay at the delay 120 in order to increase stability. For example, if a large transient burst occurs, the large transient burst may not concurrently (e.g., simultaneously) affect both the LMS unit 145 and the adaptive filter 150 if a sufficient amount of delay is added via the delay 120.

In the example embodiment of FIG. 4, in step S320, the retransmit antenna 130 transmits the amplified version of the filtered donor signal and pilot signal. Accordingly, it will be appreciated that the transmitted, amplified version of the filtered donor signal and pilot signal at step S315 corresponds to the feedback signal received at the receive antenna 105 in step S300.

Throughout the process of FIG. 4, the signal strength monitor 155 continuously measures the signal strength of the feedback training signal component of the filtered signal output from the reception LPF 115. For example, because the output of the pilot signal generator 135 is fixed and known, the feedback training signal component of the filtered signal output from the reception LPF 115 may be isolated using well-known correlation techniques. The signal strength monitor 155 provides the measured signal strength to the mode controller 160. In step S325, the mode controller 160 checks whether the feedback signal (e.g., including the retransmitted donor signal) has been sufficiently canceled based on the measured signal strength of the feedback training signal component of the filtered signal provided from the signal strength monitor 155. For example, the feedback signal may be determined to be sufficiently canceled based on a comparison between the measured signal strength of the feedback training signal component and a given threshold. In other words, the feedback training signal component may be used as an indicator of how well the entire feedback signal is being canceled. For example, if the signal strength of the feedback training signal component is less than the given threshold (e.g., 15 dB, 20 dB, etc.), the cancellation of the feedback signal may be determined to be sufficient.

In step S325, if the mode controller 160 determines the feedback signal is sufficiently canceled, the process returns to step S300 and the operation mode continues (e.g., the switch 117 remains "closed"). Otherwise, if the repeater 100 determines the feedback signal is not sufficiently canceled, the process returns to step S200 of FIG. 2, where the training mode of the repeater 100 resumes (e.g., the switch 117 transitions to an "opened" state) until an acceptable level of cancellation is achieved (e.g., based on the feedback training signal again, and not the retransmitted donor signal), and so on.

Further, while not illustrated in FIG. 4, the feedback training signal component may be adjusted during the operation mode, without having to revert back to the training mode. For example, if very good cancellation is achieved for a substantial period of time, the feedback training signal component may be "scaled back", via the pilot signal generator 135.

Example embodiments of the present invention being thus described, it will be obvious that the same may be varied in many ways. For example, as discussed in the Background of the Invention section, receive and retransmit antennas in conventional repeaters are kept physically isolated from each other due to a regenerative feedback loop caused by the retransmitted donor signal transmitted from the retransmit antenna being received at the receive antenna along with the original donor signal. Thus, while example embodiments of the present invention describe the receive and retransmit antennas 105 and 135 as "different" or separate antennas, it will be appreciated that the receive and retransmit antennas 105 and 135 may alternatively correspond to the same antenna, for example, if sufficient cancellation of the transmitted donor signal is achieved.

Such variations are not to be regarded as a departure from the spirit and scope of the exemplary embodiments of the invention, and all such modifications as would be obvious to one skilled in the art are intended to be included within the scope of the invention.

What is claimed:

1. A method of providing coverage within a wireless communications network, comprising:
    first receiving a donor signal and a transmitted version of an internally generated wideband pilot signal;
    configuring an adaptive filter signal to cancel the received transmitted version of the internally generated wideband pilot signal;
    second receiving the donor signal and a retransmitted version of the donor signal; and
    first canceling the retransmitted donor signal based on the configured adaptive filter signal, wherein the configuring step includes,
        second canceling the transmitted version of the internally generated wideband pilot signal based on the adaptive filter signal,
        determining whether the transmitted version of the internally generated wideband pilot signal has been sufficiently canceled,
        adjusting the adaptive filter signal and repeating the second canceling and determining steps if the determining step determines that the transmitted version of the internally generated wideband pilot signal has not been sufficiently canceled, and
        establishing the adaptive filter signal as the configured adaptive filter if the determining step determines that the transmitted version of the internally generated wideband pilot signal has been sufficiently canceled.

2. A method of providing coverage within a wireless communications network comprising:
    first receiving a donor signal and a transmitted version of an internally generated wideband pilot signal;
    configuring an adaptive filter signal to cancel the received transmitted version of the internally generated wideband pilot signal;
    second receiving the donor signal and a retransmitted version of the donor signal;
    first canceling the retransmitted donor signal based on the configured adaptive filter signal, wherein the first receiving and configuring steps are performed during a first mode of operation and the second receiving and the first canceling steps are performed during a second mode of operation;
    first transitioning from the first mode of operation to the second mode of operation if the configured adaptive filter signal is determined to sufficiently cancel the transmitted version of the internally generated wideband pilot signal; and
    second transitioning from the second mode of operation to the first mode of operation if the configured adaptive filter signal is determined not to sufficiently cancel the retransmitted version of the donor signal.

3. The method of claim 2, wherein the first transitioning step is performed by setting a switch to a first state and the second transitioning step is performed by setting a switch to a second state.

4. The method of claim 3, wherein the first state is a closed circuit and the second state is an open circuit.

5. The method of claim 2, further comprising:
measuring, during the first mode of operation, a signal strength of the transmitted version of the internally generated wideband pilot signal; and
determining the configured adaptive filter signal to sufficiently cancel the transmitted version of the internally generated wideband pilot signal if the measured signal strength is below a signal strength threshold.

6. The method of claim 2, wherein the second receiving step further receives the transmitted version of the internally generated wideband pilot signal.

7. The method of claim 6, further comprising:
measuring, during the second mode of operation, a signal strength of the transmitted version of the internally generated wideband pilot signal; and
determining the configured adaptive filter signal to sufficiently cancel the retransmitted donor signal if the measured signal strength is below a signal strength threshold.

* * * * *